United States Patent
Ha et al.

(10) Patent No.: US 6,756,123 B2
(45) Date of Patent: Jun. 29, 2004

(54) ANTI-CORROSION PAINT FOR STEEL WITH POLYANILINE

(75) Inventors: Jae Mok Ha, Seoul (KR); Sung Nam Hwang, Pohang (KR); Jin Woo Park, Goyang (KR); Woo Jin Choi, Seongnam (KR); Han Seob Song, Ansan (KR); Seong Kil Kim, Anyang (KR); Jong Gu Park, Ansan (KR); Yong Hee Lee, Suwon (KR); Yong Seok Park, Ansan (KR); Hong Soo Park, Ansan (KR)

(73) Assignees: AD-Tech Co., Ltd., Gunpo (KR); Samhwa Paints Ind. Co., Ltd., Ansan (KR)

( * ) Notice: Subject to any disclaimer, the term of this patent is extended or adjusted under 35 U.S.C. 154(b) by 0 days.

(21) Appl. No.: 10/234,066

(22) Filed: Sep. 3, 2002

(65) Prior Publication Data

US 2004/0005464 A1 Jan. 8, 2004

(30) Foreign Application Priority Data

Jul. 3, 2002 (KR) .................................... 2002-0038243

(51) Int. Cl.⁷ .................... B32B 27/38; B32B 27/30; B32B 27/40; B32B 15/04
(52) U.S. Cl. ..................... 428/416; 428/413; 428/414; 428/418; 428/423.1; 428/464; 428/523
(58) Field of Search ................... 428/413–414, 428/416, 418, 423.1, 523, 464; 523/400; 106/14.05, 287.22, 400

(56) References Cited

U.S. PATENT DOCUMENTS 5,853,621 A * 12/1998 Miller et al. ................. 252/500
6,054,514 A * 4/2000 Kulkarni ..................... 524/111

* cited by examiner

Primary Examiner—Philip Tucker
Assistant Examiner—Michael J Feely
(74) Attorney, Agent, or Firm—F. Chau & Associates, LLC

(57) ABSTRACT

Disclosed is an anticorrosion paint for preventing steel materials from corrosion by using polyaniline as an anticorrosion pigment. The anticorrosion paint has an excellent anticorrosion effect, long persistence of the anticorrosion effect, high durability and superior coating property controlling the anticorrosion effect, without using metal causing environmental pollution as an anticorrosion pigment. Especially, in the anticorrosion paint, the top coat paint for improving the protection of the primer coat paint and the anticorrosion effect. The top coat paint includes 40 to 89 wt % of matrix resin, 5 to 54 wt % of colored pigment, 1 to 50 wt % of dopants and 5 to 54 wt % of mixed solvents, and the primer coat paint includes 3 to 49 wt % of the polyaniline, 40 to 86 wt % of the matrix resin, 1 to 47 wt % of the dopants and 10 to 56 wt % of the mixed solvents. The anticorrosion paint plays a role in exerting persistently the excellent anticorrosion effect without causing environmental problem.

7 Claims, No Drawings

ANTI-CORROSION PAINT FOR STEEL WITH POLYANILINE

TECHNICAL FIELD

The present invention relates to an anticorrosion paint which employs polyaniline as an anticorrosion pigment, so as to prevent the corrosion of metal materials, in particular, of steel materials. More specifically, the present invention relates to an anticorrosion paint, which can provide persistently excellent anticorrosion effect without using metal which causes environmental pollution.

BACKGROUND ART

As generally known in the art, the corrosion of metal materials including steel is a serious problem in various industrial fields. The corrosion of steel brings enormous loss in property and industry, and half of steel production is consumed in replacing the corroded steel structures every year. Various anticorrosion paints have been used to prevent the corrosion of metal materials, especially steel materials.

The above-mentioned anticorrosion paint is composed of metal, which is utilized as general anticorrosion pigment, and organic polymeric resins/inorganic resin which makes the metal to adhere to the surface of steel and protects coated object from corrosive environments. The anodizing forming type using Pb, Cr and the like, and the sacrificial anode anticorrosive type using Zn have been previously used as anticorrosion pigments.

However, the anodizing forming type anticorrosion pigments are classified as heavy metal, and so have the defect of causing another environmental problem at the time of elution, and the sacrificial anode anticorrosive type anticorrosion pigments exert an anticorrosion capability with an electrochemical sacrificial mode using the ionization tendency of the anticorrosion pigment, so have a defect of being unable to protect metal materials from corrosion for long period of time because the capability of the sacrificial anode anticorrosion decreases as the corrosion of sacrificial metals increases over time.

Since the rust of metal materials results from the action of air, water or carbon dioxide, the anticorrosion paints should perform two actions: to prevent them from contacting the surface of metal materials and block chemically the generation of the rust. A paint for primer coat should have particularly strong adherence to a metal basis and a paint for top coat should not permeate any air or water through the coating of paint, the low occurrence of cracking, high durability and high weatherability.

The oil based paints, which contain the mixed drying oil and the anticorrosion pigment, and the red lead paints, which contain the mixed red lead ($Pb_3O_4$) and boiled oil, are mainly used as anticorrosion paints. The anticorrosion paints that can substitute for the red lead paints comprise zinc powder, lead suboxide, basic zinc chromate (zinc yellow), or basic lead chromate (zinc chromide) pigments, in which the latter two pigments have a chemical anticorrosion effect. Besides, the anticorrosion paints may contain iron oxide, Bengala alone, or zinc yellow and red lead as combination pigments. As vehicles, those suitable for the primer coat or topcoat paints are used, and oil varnish and synthetic resin varnish as well as boiled oil are usually used. Recently, the paint, in which basic zinc chromate, phosphoric acid and butyral resin are dispersed into a mixed solvent of alcohol, ketone and water, is used for anticorrosive treatment of metal materials including aluminum, zinc or tin.

However, the prior anticorrosion paints as described above have problems such as the environmental pollution or low persistence of the anticorrosion effect.

Meanwhile, polyaniline is known as a material hard to handle because it is insoluble and difficult to be dispersed, despite its excellent function, it has many limits in its application. A recent technical development is capable of dispersing polyaniline into a matrix resin and permits its application in various fields and the development of products using it, but any application to the anticorrosion paints has not been reported.

DISCLOSURE OF THE INVENTION

Accordingly, the present invention is made to solve the problems of the prior art and the object of the invention is to provide anticorrosion paints for steel using polyaniline which has an excellent anticorrosion effect, long persistence of the anticorrosion effect, high durability and superior coating property controlling the anticorrosion effect, without using metals which cause environmental pollution as an anticorrosion pigment.

Another object of the present invention is to provide a method of simply preparing the anticorrosion paint.

To accomplish the above objects and other objects which can easily follow upon the above objects, the present invention provides a coated steel substrate comprising an anticorrosion paint system, wherein the paint system comprise a primer coat paint layer and a top coat paint layer: a primer coat paint layer including 3 to 49 weight percent (wt %) of the polyaniline, 40 to 86 wt % of the matrix resin, 1 to 47 wt % of the additives and 10 to 56 wt % of the mixed solvent; and a top coat paint layer for protecting for protecting the primer coat paint layer and improving the anticorrosion effect, the top coat paint layer including 40 to 89 wt % of matrix resin, 5 to 54 wt % of colored pigment, 1 to 50 wt % of additives and 5 to 54 wt % of mixed solvent.

Also, the anticorrosion paint of the present invention is characterized in that it uses no metal which has mainly been used in the prior arts as an anticorrosion pigment to solve the defects of the previous anticorrosion paint, and it uses polyaniline with an excellent anticorrosion function as the anticorrosion pigment to provide excellent anticorrosion effect on metal materials, particularly steel materials.

BEST MODE FOR CARRYING OUT THE INVENTION

The present invention will hereinafter be described in further detail regarding the anticorrosion paint for steel using the polyaniline according to the preferred embodiments of the present invention.

Generally, the polyaniline is classified into a fully oxidized type, a partially oxidized type and a reduced type depending on an oxidation degree. Although the emeraldine base form of polyaniline (PANI-EB) is in an insulated state, it is transferred to the emeraldine salt form of polyaniline (PANI-ES) in a conductive state by doping the PANI-EB in protonic acid, such as hydrochloric acid. Electric conductivity is changed by doping level, the used organic solvent, and the kind of dopant or molecular weight. By improving doping level, the insulator-metal transition phenomenon occurs. The PANI-ES plays a role as a charge carrier by the formation of polaron that has a mobile defect in one-dimensional chain structure.

Emeraldine salt (electric conductivity: ~5 S/cm) is synthesized in powder form by oxidatively polymerizing aniline monomer using oxidants, such as ammonium peroxydisulfate(APS; $(NH_4)S_2O_8$) in protonic acid solution including 1M hydrochloric acid(HCl). The emeraldine salt is transferred to the insulating emeraldine base (electric conductivity: ~$10^{-10}$ S/cm) by deprotonation in basic solution, such as ammonium hydroxide($NH_4OH$).

Since both forms of polyaniline (base and salt thereof) were not dissolved in solvent, they have been difficult to be fabricated, but after it was reported in 1986 that N-methyl-2-pyrrollidinone could be used as solvent, the polyanilines became to be fabricated into film, fiber or elastomer. When the film or fiber was stretched four times and then doped with 1M HCl, it represented an electrical conductivity of 220 S/cm. The degree of cross-linking is controlled by varying the molecular weight of the polyaniline used for fabrication of the film, the use of solution or the evaporation rate of the solvent, and the resultant diverse films represent various results in crystallinity, electric conductivity after doping, an electric conductivity mechanism and electromagnetic interference shielding capability.

Recently, since the polyaniline doped with the functional acid like camphorsulfonic acid or dodecylbenzenesulfonic acid is known to have an increased solubility in nonpolar or mild polar solvents, such as m-crezol or chloroform, film or fiber can be fabricated directly from the polyaniline doped with the functional acid in the conductive state. This resultant film showed the phenomenon of an electrical conductivity of 400 S/cm at its maximum, depending on solvent. This phenomenon has been described by the notion of "effectively doped site" formed in the chain of polymer, depending on solvent. Unlike the previous doped polyaniline film, it was confirmed that this resultant film has a high negative dielectric constant and exhibits the metallic electrical conductivity because the electrical conductivity of this resultant film is little temperature-dependent.

The polyaniline used as an anticorrosion pigment in the present invention is both emeraldine salt of a reduced type and emeraldine base of an oxidized type.

The polyaniline used in the present invention is prepared as follows (in which aniline monomer is purified before use, and ammonium peroxydisulfate, $H_2SO_4$ and formic acid are used as such):

(1) A solution of aniline (40 Ml) in 80:20 (v/v %) of 1M $H_2SO_4$ and formic acid (800 Ml) in a vessel 1 is first cooled to 0° C. and a solution of ammonium peroxydisulfate (23 g) as an oxidant in 1M $H_2SO_4$ (200 Ml) in a vessel 2 is cooled to 0° C. After the solution containing the oxidant of the vessel 2 is added to the solution containing aniline of the vessel 1 over 2 min while stirring with a magnetic bar, the resultant mixture is reacted for approximately 90 min while stirring with a magnetic bar. After that, the reaction mixture is filtered through a filter paper.

(2) The resulting filtrate from process (1) is added without aniline at 0° C. to a solution of ammonium peroxydisulfate (23 g) in 80:20 (v/v %) of 1M $H_2SO_4$ and formic acid and then the solution reaches 1L of total volume. The resultant mixture is reacted for approximately 90 min, and then the reaction mixture is filtered through a filter paper three times.

(3) The resultant filtered solid from processes 1 and 2 is added again to 1M HCl solution, stirred to make a suspension, and then further stirred by a magnetic bar for approximately 15 min, and filtered through a filter paper to obtain the reduced form of polyaniline.

After the filtrate is washed with 1M HCl until it is completely colorless, the protonated polyaniline is obtained.

Such a preparation of polyaniline according to the present invention is characterized in that the process of adding the only oxidant without additional aniline to the filtrate obtained after synthesis is repeated three to five times and nearly similar polyaniline in the physiochemical properties such as an electrical conductivity and thermal stability is obtained.

Therefore, the synthesis of the present invention provides much higher yield than that of the prior art.

And the reduced form of polyaniline obtained from the above synthesis may be dedoped with 0.1M $NH_4OH$ to produce the oxidized form of polyaniline.

The molecular structure of polyaniline of the present invention is as follows:

Formula 1

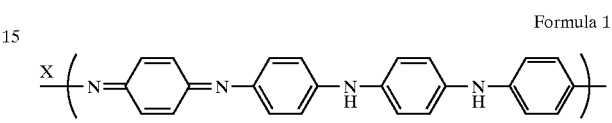

From the preparation of the present invention, the aniline monomer was synthesized to the polymerized polyaniline having 10,000 to 50,000 of molecular weight.

The content of polyaniline used in the present invention is preferably in a range of 3 to 49% by weight. When the content of polyaniline is less than 3% by weight, it results in the problems such as poor anticorrosion effect and a reduced persistence of anticorrosion effect. When the content of the polyaniline exceeds 49% by weight, the addition of polyaniline has little improvement so that it is not economical, and the film shows a tendency of being easily separated decrease of film durability.

First of all, the method of preparing a primer coat using polyaniline (either reduced form or oxidized form) comprises the step of mixing polyaniline, a matrix resin, various additives and mixed solvents at a predetermined ratio, and milling the mixture. The primer coat may further comprise an extender.

More particularly, 3 to 49% by weight (wt %) of polyaniline, 40 to 86 wt % of a matrix resin, 1 to 47 wt % of additives, and 10 to 56 wt % of mixed solvents are mixed, and the mixture is milled for 90 min using an attrition mill. If desired, an extender may be added to the mixture and the content of the extender is preferably in a range of 5 to 15 wt %. When the extender is added, the content of the matrix resin and the mixed solvents together should be decreased by the same amount as that of the extender.

The matrix resins are for example cellulose acetate propionate (100% of solid content), a thermoplastic polyurethane resin (50% of solid content), acrylic urethane (50% of solid content), epoxy ester (60% of solid content) or epoxy resin (100% of solid content), which can be used either alone or as a mixture of two or more.

The content of matrix resins is preferably in a range of 40 to 86 wt %. Where the resin content is less than 40 wt %, it is disadvantageous in that adhesion between the surface of metal materials and paint is decreased. Where the resin content exceeds 86 wt %, it is disadvantageous in that the content of polyaniline is relatively decreased and the anticorrosion effect is reduced.

As additives, a wetting dispersion agent, an anti-settling agent, a defoamer, an anti-cratering agent, an anti-sagging agent, a leveling agent, an anti-pinhole agent, or a plasticizer may be employed. It is preferred that a mixture of at least two kinds of the above additives are used according to the properties of the paint. The kind and content of the additives will be readily understood by those who skilled in the art.

The content of the additives should do not exceed total 47 wt %. Where the content exceeds 47 wt %, it is disadvantageous in that the adhesion between the surface of metal materials and the paint is greatly decreased.

As extenders, talc, calcium carbonate, barium sulfate or clay may be used.

As solvents, xylene, toluene, methyl isobutyl ketone, butyl acetate, ethyl acetate, cellosolve acetate, ethyl cellosolve, n-butanol, iso-butanol, isopropylalcohol, methyl ethyl ketone, cyclohexanone, methanol or diacetone alcohol may be used either alone or as a mixture of two or more thereof.

The top coat that is used to protect an anticorrosion paint for the primer coat and to improve an anticorrosion effect is prepared by adding 40 to 89 wt % of matrix resins, 5 to 54 wt % of colored pigments, 1 to 50 wt % of additives and 5 to 54 wt % of mixed solvents.

Epoxy resin or acrylic urethane resin may be employed as the resins, and inorganic or organic pigments, such as titanium oxide, iron oxide (reddish brown, yellow or black), phthalocyanine blue or phthalocyanine green, may be used after being mixed depending on a desired color, as the colored pigments. As the additives, a wetting dispersion agent, an anti-settling agent, a defoamer, an anti-cratering agent, an anti-sagging agent, a leveling agent, anti-decolorizing agent or an anti-pinhole agent may be employed.

As Solvents, xylene, toluene, methyl isobutyl ketone, butyl acetate, ethyl acetate, cellosolve acetate, ethyl cellosolve, n-butanol, isobutanol, isopropylalcohol, methyl ethyl ketone, cyclohexanone, methanol or diacetone alcohol may be used either alone or as a mixture of two or more thereof.

INDUSTRIAL APPLICABILITY

The present invention will hereinafter be described in further detail by examples and comparison examples. It should however be borne in mind that the present invention is not limited to or by the examples.

EXAMPLE 1

1-1. Preparation of the Paint for Primer Coat 60 wt % of thermoplastic polyurethane resin (50% of solid content), 7 wt % of reduced polyaniline (ES), 0.5 wt % of Bentone #34(RHEOX Co.), 0.5 wt % of Anti-Terra-U (BYK Chemi), and 21 wt % of mixed solvent containing cellosolve acetate, methyl ethyl ketone and ethyl cellosolve were mixed, stirred for 30 min, and milled by an attrition mill so that a particle size came to above 5 as North standard graduations (NS) unit. Subsequently, 0.5 wt % of BYK-066 (BYK Chemie) and BYK-410 (BYK Chemie), and 10 wt % of mixed solvents were added to the mixture and stirred for 30 min to obtain an anticorrosion primer coat paint according to the present invention.

1-2. Preparation of the Paint for Topcoat 55 wt % of acrylic urethane resin (50% of solid content), 20 wt % of $TiO_2$ R-902 (Dupont. Co), 0.3 wt % of Benton #34 (RHEOX Co.) and 0.2 wt % of Anti-Terra-U (BYK Chemie) were mixed, stirred for 30 min, and milled by an Attrition mill so that a particle size came to above 6 as North standard graduations (NS) unit. Subsequently, 0.5 wt % of BYK-066 (BYK Chemie), 0.4 wt % of BYK-410 (BYK Chemie), 0.3 wt % of BYK-35 (BYK Chemie) and 8.3 wt % of organic solvents were added to the mixture and stirred for 30 min to obtain a top coat paint.

1-3. Physical Properties Test 1-3-1. Preparation of Test Sample

Cold-rolled steel panel(ASTM A 109) was treated according to procedure D(solvent wiping method) of ASTM D 609. Specifically, a panel was prepared to conform to a size of sample that would be pretreated mechanically. The panel was coated with the paint for primer coat prepared from the step 1-1 in a thickness of dried film of 25 $\mu$m and dried at room temperature (25° C.) for 24 hours. Then, the paint for top coat prepared from the step 1-2 was coated twice (40 $\mu$m of coating amount per one time) on the panel by an air spray so that the thickness of a dried film comes to 80 $\mu$m, and dried at room temperature (25° C.) for 72 hours.

1-3-2. Adhesion Test

The adhesion test of paint was performed according to the test method B(cross-cut tape test) of ASTM D 3359. Specifically, a grid on the film of the sample prepared from 1-3-1 was made by a knife, and then the grid areas were brought into contact each other by using pressure-sensitive tape so that the grid areas adhered to the pressure-sensitive tape equally. After detaching the pressure-sensitive tape from the film, the detached state of the film on the grid areas from the substrate was visually compared and evaluated and classified into grades from 5B to 0B. In the results, 5B represents none of the squares of the lattice is detached state. 0B represents whole squares have detached state.

1-3-3. Acid- and Alkaline-Resistance Tests

Acid- and alkaline-resistance tests were performed according to a test method on the immersion resistance of a dried film of ASTM D 1308. Specifically, the sample prepared from the 1-3-1 was submerged in 5% HCl solution and 5% NaOH solution, respectively, for 72 hours. Then, the change of blistering or 60° specular gloss was measured and evaluated and classified into 4 grades consisting of excellent, good, medium and poor.

1-3-4. Anticorrosion Test (Salt Spray Fog Test)

Salt spray fog test was performed according to a method of ASTM B 117. The evaluation of scribed specimens were formed on the sample (1-3-1) according to a method 2 (scraping) of ASTM D 1654, the sample was exposed to a salt spray chamber in which a solution of 5 wt % NaCl was sprayed according to ASTM B 117(atomization and quantity of fog) at a temperature of 35° C. After 500 hours, the state of film was observed. The surface states of unscribed areas and scribed areas of the sample were observed, the degree of rusting was estimated according to ASTM D 610, and the degree of blistering was estimated according to a basis of ASTM D 714. The degree of rusting was classified into 11 grades. Where the occurrence of rust on the sample surface is less than 0.01%, the rusting degree was designated as 10. Where the occurrence of rust on the sample surface is 100%, the rusting degree was designated as 0. The degree of blistering was classified into 5 steps consisting of 10, 8, 6, 4, and 2 according to the size of blistering occurrence site, in which 10 is represented as no blistering and 2 is represented as progressively larger sizes. Also, blister density was estimated and classified into 4 steps consisting of F(few), M(medium), MD(medium dense) and D(dense).

EXAMPLE 2

The anticorrosion paint was prepared according to the procedure from Example 1, except that the oxidized polyaniline was substituted for the reduced polyaniline and talc was substituted for 10 wt % of solvents as an extender. The physical properties of the resulting paint were evaluated and the results were described in Table 1 and 2.

EXAMPLE 3

The anticorrosion paint for the primer coat was prepared by using 25 wt % of matrix resin comprising cellulose acetate propionate and epoxy resin (in a mixture ratio of 4:1), 7 wt % of reduced polyaniline (ES), 0.3 wt % of Benton #34 (RHEOX Co.), 0.2 wt % of Anti-Terra-U (BYK Chemie), and 67.5 wt % of mixed solvents comprising methyl ethyl ketone, ethyl cellosolve and butyl acetate. The paint for the top coat and test sample were prepared according to the procedure from Example 1, and the results of physical properties tests were described in Table 1 and 2.

EXAMPLE 4

The anticorrosion paint was prepared according to the procedure from Example 3, except that the, oxidized polyaniline was substituted for the reduced polyaniline. The results of physical properties tests were described in Table 1 and 2.

EXAMPLE 5

The anticorrosion paint was prepared according to the procedure from Example 1 and tested for physical properties, excepting that the anticorrosion paint for the primer coat was prepared by using 50 wt % of epoxy ester, 7 wt % of reduced polyaniline (ES), 0.3 wt % of Benton #34 (RHEOX Co.), 0.5 wt % of Anti-Terra-U (BYK Chemie), 0.2 wt % of 5% Co, 0.2 wt % of methyl ethyl ketoxim and 41.8 wt % of mixed solvents comprising xylene and butyl acetate. The results of physical properties tests were described in Table 1 and 2.

EXAMPLE 6

The anticorrosion paint was prepared according to the procedure from Example 5, except that the oxidized polyaniline was substituted for the reduced polyaniline. The results of physical properties tests were described in Table 1 and 2.

EXAMPLE 7

The anticorrosion paint was prepared according to the procedure from Example 1 and tested for physical properties, excepting that the anticorrosion paint for the top coat was prepared by using 55 wt % of epoxy resin, 25 wt % of $TiO_2$ R-902 (Dupon Co.), 0.3 wt % of Benton #34 (RHEOX Co.), 0.2 wt % of Anti-Terra-U (BYK Chemie) and 44.5 wt % of mixed solvents comprising ethyl cellosolve, xylene and n-butanol. The results of physical properties tests were described in Table 1 and 2.

EXAMPLE 8

The anticorrosion paint was prepared according to the procedure from Example 2, except that the topcoat paint prepared from Example 7 was used. The results of physical properties tests were described in Table 1 and 2.

EXAMPLE 9

The anticorrosion paint was prepared according to the procedure from Example 3, except that the topcoat paint prepared from Example 7 was used. The results of physical properties tests were described in Table 1 and 2.

EXAMPLE 10

The anticorrosion paint was prepared according to the procedure from Example 4, except that the topcoat paint prepared from Example 7 was used. The results of physical properties tests were described in Table 1 and 2.

EXAMPLE 11

The anticorrosion paint was prepared according to the procedure from Example 5, except that the topcoat paint prepared from Example 7 was used. The results of physical properties tests were described in Table 1 and 2.

EXAMPLE 12

The anticorrosion paint was prepared according to the procedure from Example 6, except that the topcoat paint prepared from Example 7 was used. The results of physical properties tests were described in Table 1 and 2.

Comparison Example 1

The anticorrosion paint was prepared according to the procedure from Example 1, except that, in the preparation of primer coat paint, thermoplastic polyurethane was substituted for the content of polyaniline as an anticorrosion pigment. The results of physical properties tests were described in Table 1 and 2.

Comparison Example 2

The anticorrosion paint was prepared according to the procedure from Example 1, except that, in the preparation of primer coat, cellosolve acetate propionate was substituted for the content of polyaniline as an anticorrosion pigment. The results of physical properties tests were described in Table 1 and 2.

Comparison Example 3

The anticorrosion paint was prepared according to the procedure from Example 1, except that, in the preparation of primer coat, epoxy ester was substituted for the content of polyaniline as an anticorrosion pigment. The results of physical properties tests were described in Table 1 and 2.

TABLE 1

| sample test items | | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Adhesion | | 4B | 5B | 5B | 4B | 5B | 5B | 5B | 4B | 5B |
| Acid resistance | | Excellent | Excellent | Excellent | Excellent | Excellent | Excellent | Excellent | Excellent | Excellent |
| Alkaline resistance | | Excellent | Excellent | Excellent | Excellent | Excellent | Excellent | Excellent | Excellent | Excellent |
| Unscribed Areas | Rusting | 10 | 10 | 10 | 10 | 10 | 10 | 10 | 10 | 10 |
| | Blistering | 10 | 10 | 10 | 8F | 10 | 10 | 10 | 10 | 10 |
| Scribed Areas | Rusting | 9 | 10 | 10 | 8 | 9 | 10 | 0 | 4 | 0 |
| | Blistering | 10 | 10 | 10 | 6D | 10 | 10 | 10 | 8MD | 10 |

F:few M:medium MD: medium dense D:dense

TABLE 2

| sample test items | | Ex. 7 | Ex. 8 | Ex. 9 | Ex. 10 | Ex. 11 | Ex. 12 |
| --- | --- | --- | --- | --- | --- | --- | --- |
| Adhesion | | 5B | 5B | 5B | 5B | 5B | 5B |
| Acid resistance | | Good | Good | Good | Medium | Excellent | Excellent |
| Alkaline resistance | | Excellent | Excellent | Excellent | Excellent | Excellent | Excellent |
| Unscribed Areas | Rusting | 10 | 10 | 10 | 10 | 10 | 10 |
| | Blistering | 10 | 10 | 10 | 8F | 10 | 10 |
| Scribed Areas | Rusting | 8 | 8 | 8 | 6 | 8 | 6 |
| | Blistering | 10 | 10 | 10 | 8M | 10 | 10 |

The anticorrosion paint of the present invention prepared as described above is one-component type, can be easily coated on steel structures, and provides an excellent anticorrosion effect.

It will be clear that this invention may be practiced otherwise than as particularly described in the foregoing examples. Numerous modifications and variations of the present invention are possible in light of the above teachings.

As apparent from the foregoing, the present invention provides an anticorrosion paint comprising a top coat paint and a primer coat paint, in which the top coat paint for improving the protection of the primer coat paint and the anticorrosion effect includes 40 to 89 wt % of matrix resin, 5 to 54 wt % of colored pigment, 1 to 50 wt % of additives and 5 to 54 wt % of mixed solvents, characterized in that the primer coat paint includes 3 to 49 wt % of the polyaniline, 40 to 86 wt % of the matrix resin, 1 to 47 wt % of the additives and 10 to 56 wt % of the mixed solvents. The anticorrosion paint plays a role in exerting persistently the excellent anticorrosion effect without causing any environmental problem.

What is claimed:

1. A coated substrate comprising an anticorrosion paint system, said paint system comprising:

a primer coat paint layer including 3 to 49 weight percent (wt %) of polyaniline, 40 to 86 wt % of matrix resin, 1 to 47 wt % of additives, and 10 to 56 wt % of mixed solvent; and a top coat paint layer for protecting the primer coat paint layer and improving the anticorrosion effect, the top coat paint layer including 40 to 89 weight percent (wt %) of matrix resin, 5 to 54 wt % of colored pigment, 1 to 50 wt % of additives, and 5 to 54 wt % of mixed solvent.

2. The coated substrate according to claim 1, wherein the polyaniline is a reduced form of polyaniline (emeraldine salt) doped with hydrochloric acid (HCl) solution or an oxidized form of polyaniline (emeraldine base) dedoped with ammonium hydroxide ($NH_4OH$).

3. The coated substrate according to claim 1 wherein the matrix resin of the primer coat paint comprises acrylic urethane, thermoplastic polyurethane resin, cellulose acetate propionate, epoxy ester or epoxy resin that is used either alone or as a mixture of two or more resins.

4. The coated substrate according to claim 1 wherein the matrix resin of the top coat paint comprises acrylic urethane or epoxy.

5. The coated substrate according to claim 1, wherein an extender is substituted for 5 to 15% by weight of the matrix resin and the mixed solvents in the primer coat paint layer.

6. The coated substrate according to claim 5 wherein the extender comprises talc, calcium carbonate($CaCO_3$), barium sulfate($BaSO_4$) or clay.

7. The coated substrate according to claim 1 wherein the substrate is steel.

* * * * *